(12) United States Patent
Fuchimukai

(10) Patent No.: US 7,116,363 B2
(45) Date of Patent: Oct. 3, 2006

(54) DIGITAL CAMERA AND EJECTION MECHANISM FOR MEMORY CARD IN MOBILE INSTRUMENT

(75) Inventor: Atsushi Fuchimukai, Tochigi (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/094,608

(22) Filed: Mar. 12, 2002

(65) Prior Publication Data
US 2002/0130964 A1   Sep. 19, 2002

(30) Foreign Application Priority Data

| Mar. 16, 2001 | (JP) | ............................. 2001-077116 |
| Mar. 16, 2001 | (JP) | ............................. 2001-077118 |

(51) Int. Cl.
*H04N 5/76* (2006.01)

(52) U.S. Cl. ................................. 348/231.8

(58) Field of Classification Search ................ 348/373, 348/231.8, 374, 375, 231.99, 231.7
See application file for complete search history.

(56) References Cited

U.S. PATENT DOCUMENTS

| 5,153,730 | A | * | 10/1992 | Nagasaki et al. | ........ 348/231.6 |
| 5,299,089 | A | * | 3/1994 | Lwee | ......................... 361/684 |
| 5,790,193 | A | * | 8/1998 | Ohmori | ....................... 348/375 |
| 5,907,354 | A | * | 5/1999 | Cama et al. | ............ 348/231.7 |
| 6,137,710 | A | * | 10/2000 | Iwasaki et al. | ................ 365/52 |
| 6,590,614 | B1 | * | 7/2003 | Nishio et al. | ............... 348/374 |
| 2001/0017664 | A1 | * | 8/2001 | Misawa | ....................... 348/373 |
| 2002/0033897 | A1 | * | 3/2002 | Mayne et al. | ................ 348/373 |
| 2002/0071051 | A1 | * | 6/2002 | Ikeda | .......................... 348/375 |
| 2003/0048605 | A1 | * | 3/2003 | Kyozuka et al. | ............ 361/686 |
| 2003/0095386 | A1 | * | 5/2003 | Le et al. | ...................... 361/737 |

OTHER PUBLICATIONS

Steve's Digicam Review of the Panasonic PalmCam PV-DC2590; http://www.steves-digicams.com/pvdc2590.html; downloaded Jan. 7, 2006.*
Kodak Professional DCS 500 Series Digital Camera User's Guide Eastman Kodak Company and Canon Inc. 2000.*

* cited by examiner

*Primary Examiner*—Tuan Ho
*Assistant Examiner*—Timothy J. Henn
(74) *Attorney, Agent, or Firm*—Greenblum & Bernstein, P.L.C.

(57) ABSTRACT

A digital camera having a camera body includes a small memory card receiving member, a large memory card receiving member having a width larger than the width of the small memory card receiving member, and a forward projecting portion having a inclined portion which gradually protrudes in a forward direction toward a bottom portion of the camera body, the forward projecting portion being located below a lens barrel of the digital camera. The small and large memory card receiving members are provided within the forward projecting portion in the camera body, the small memory card receiving member being located above the large memory card receiving member and located within the inclined portion in the camera body. A front end of the small memory card receiving member is located at a position more rearward than a front end of the large memory card receiving member.

12 Claims, 7 Drawing Sheets

DIGITAL CAMERA AND EJECTION MECHANISM FOR MEMORY CARD IN MOBILE INSTRUMENT

BACKGROUND OF THE INVENTION

1. Field of the Invention

The present invention relates to a digital camera having a large memory capacity in which the operability of a lens barrel is enhanced, and an ejection mechanism for a memory card used in a mobile instrument such as a digital camera or a personal computer.

2. Description of the Related Art

In a conventional digital camera which incorporates a substrate having an electronic circuit thereon, a memory card receiving member (receptacle), and a connector for the memory card, in a camera body of an interchangeable lens type single lens reflex camera, the memory card receiving member is, in general, provided in the camera body and extends substantially horizontally in the vicinity of the bottom of the camera body.

In such an arrangement, in order to increase the memory capacity of the digital camera so as to take a large number of pictures without exchanging the memory card, it is possible to provide two upper and lower PC card receiving members, so that two PC cards can be stored at one time.

However, the PC card is long (wide) in the forward/rearward direction (i.e., in the optical axis direction of a camera lens of the camera) and, hence, if the two PC card receiving members are horizontally provided in the vicinity of the bottom of the camera body, it is necessary to provide a bulged portion which protrudes forwardly on a lower portion of the front surface of the camera body. Consequently, the space between the bulged portion and the lens barrel is small, so that it is difficult for an operator to operate the lens barrel (e.g., focusing ring or stop ring, etc.). This problem is more serious for a digital camera whose size in the upward/downward direction is small.

In general, the PC card receiving member is mounted to a substrate provided in the camera body. If other electrical elements are mounted to the substrate, the substrate, and accordingly the camera body, are increased in size.

Moreover, a memory card receiving member which receives a memory card, which can store various data, can be arranged in a body of a mobile instrument such as a digital camera. In known mobile instruments, a plurality of card memory receiving members having different widths are arranged therein.

Generally speaking, the memory card inserted in the memory card receiving member is ejected therefrom by operating an ejector button provided on the side of the memory card receiving member.

However, if the memory card is a PC card whose width is large, the ejector button provided on the side of the memory card receiving member increases the width of the mobile instrument. The increased width of the mobile instrument is undesirable from the viewpoint of function and design.

SUMMARY OF THE INVENTION

The present invention provides a digital camera whose body is small which has a large memory capacity, wherein a large space is formed between a bulged portion protruding forwardly from a front surface the camera body and a lens barrel, so that the operability of the lens barrel can be enhanced.

The present invention also provides an ejection mechanism for a memory card in a mobile instrument, wherein a large memory card receiving member having a large width, a small memory card receiving member having a small width, and an ejector button which is actuated to eject the memory cards received in the large and small memory card receiving members, can be arranged in the mobile instrument without increasing the width of the mobile instrument.

For example, in an embodiment, a digital camera is provided, including a small memory card receiving member in which a small memory card can be inserted; a large memory card receiving member in which a large memory card can be inserted, the width in a forward/rearward direction of the digital camera body of the large memory card being larger than the width of the small memory card; and a forward projecting portion having a inclined portion which gradually protrudes in a forward direction toward a bottom portion of the digital camera body, the forward projecting portion being located below a lens barrel of the digital camera. The small memory card receiving member and the large memory card receiving member are provided within the forward projecting portion in the digital camera body, the small memory card receiving member being located above the large memory card receiving member and located within the inclined portion in the digital camera body. A front end of the small memory card receiving member is located at a position more rearward than a front end of the large memory card receiving member, with respect to the forward/rearward direction.

The large memory card receiving member can be a PC card receiving member, and the small memory card receiving member can be a CF card receiving member.

It is desirable for the digital camera body to be provided on a side surface thereof with an opening, through which the small and large memory cards can be inserted in, and removed from, corresponding small and large memory card receiving members.

In another embodiment, an ejection mechanism for a memory card in a mobile instrument is provided, including a small memory card receiving member which can removably receive a small memory card; a large memory card receiving member which can removably receive a large memory card, wherein the width of the large memory card receiving member in a direction perpendicular to a memory card insertion direction thereof is larger than a width of the small memory card receiving member; and an ejector button for ejecting at least one of the small and large memory cards inserted in respective the small and large memory card receiving members. The small memory card receiving member lies on a plane parallel to the large memory card receiving member. The ejector button is arranged in a space on at least one side of the small memory card receiving member.

It is desirable for the small memory card receiving member to be located above the large memory card receiving member.

The large memory card receiving member can be a PC card receiving member, and the small memory card receiving member can be a CF card receiving member.

It is desirable for the mobile instrument to be provided on a side surface thereof with an opening, through which the small and large memory cards can be inserted in, and removed from, corresponding the small and large memory card receiving members.

The mobile instrument can be a digital camera.

The present disclosure relates to subject matter contained in Japanese Patent Application Nos. 2001-77116 and 2001-

77118 (both filed on Mar. 16, 2001) which are expressly incorporated herein by reference in their entireties.

BRIEF DESCRIPTION OF THE DRAWINGS

The invention will be discussed below with reference to the accompanying drawings, in which.

DESCRIPTION OF THE PREFERRED EMBODIMENT

Figure 1:
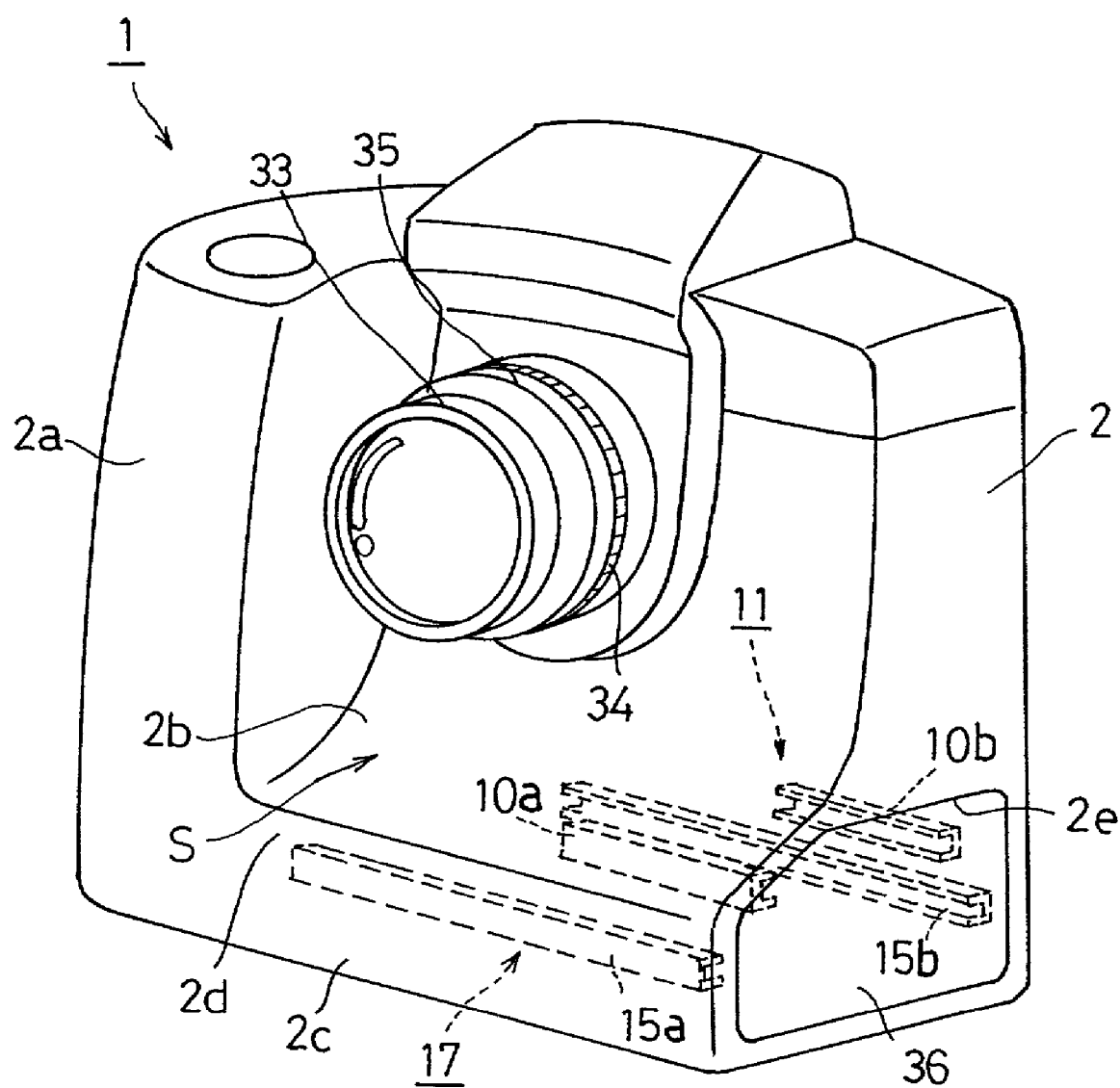
FIG. 1 is a perspective view of a digital camera according to an embodiment of the present invention.

Note that in the following description, the forward/rearward direction refers to the optical axis direction of a camera lens of a digital camera 1 shown in FIG. 1, and the upward/downward direction refers to the vertical direction with respect to the digital camera 1 shown in FIG. 1, and the lateral direction refers to a direction perpendicular to the forward/rearward direction and perpendicular to the upward/downward of the digital camera 1.

The digital camera (mobile instrument) 1 has a camera body 2 which is provided therein with a support member 3 (FIG. 2) which is in turn provided on its lower surface with a mount frame 4 having a front surface inclined forwardly. Upper, intermediate and lower substrates 5, 6 and 7 which lie in substantially horizontal planes, with respect to the digital camera 1 shown in FIG. 1, are secured to the mount frame 4. As can be seen in FIG. 2, the widths of the three substrates 5, 6 and 7 in the forward/rearward direction are increasingly larger from the upper substrate 5 toward the lower substrate 7.

A video output terminal 8 and a connector 9 for communication with an external device are mounted to the upper surface of the intermediate substrate 6. A pair of front and rear CF card guides 10a and 10b, along which a CF card (Compact Flash sized I/O card) "A" can be inserted, and a CF card connector (not shown) are mounted to the lower surface of the lower substrate 7. The front and rear CF card guides 10a and 10b constitute a CF card receiving member (small memory card receiving member) 11.

The CF card connector is electrically connected to the lower substrate 7. An ejector button 12 is provided in rear portion of the rear CF card guide 10b. A CF card ejection mechanism including the ejector button 12 is per se known, wherein when the ejector button 12 is depressed in the left direction as shown in FIG. 1 (into the camera body), the CF card "A" inserted in the CF card receiving member 11 is disconnected from the CF card connector, so that the CF card "A" can be ejected from the CF card receiving member 11.

Front and rear securing members 13 are secured to the front and rear ends of the lower surface of the substrate 7. A first power supply circuit board 14 which is electrically connected to a power supply source (dry cell) is secured to the lower surfaces of the front and rear securing members 13. The first power supply circuit board 14 is provided on the lower surface thereof with a pair of front and rear PC card guides 15a and 15b, the length thereof being greater than that of the front and rear CF card guides 10a and 10b (see FIG. 1), and a PC card connector 16 which is electrically connected to the first power supply circuit board 14. A PC card "B" can be inserted into the digital camera 1 via the front and rear PC card guides 15a and 15b, as shown in FIG. 2.

The front and rear PC card guides 15a and 15b constitute a PC card receiving member (large memory card receiving member) 17 whose width in the forward/rearward direction is greater than that of the CF card receiving member 11. The front end of the PC card receiving member 17 is located in front of the front end of the CF card receiving member 11. The right end, with respect to FIG. 1, of the PC card receiving member 17 is flush with the right end of the CF card receiving member 11. Furthermore, the CF card receiving member 11 lies on a plane positioned above and parallel to the PC card receiving member 17. Namely, the CF card "A" is inserted in the CF card receiving member 11 along a plane which lies above and parallel to a plane along which the PC card "B" lies during insertion thereof into the PC card receiving member 17.

Figure 3:
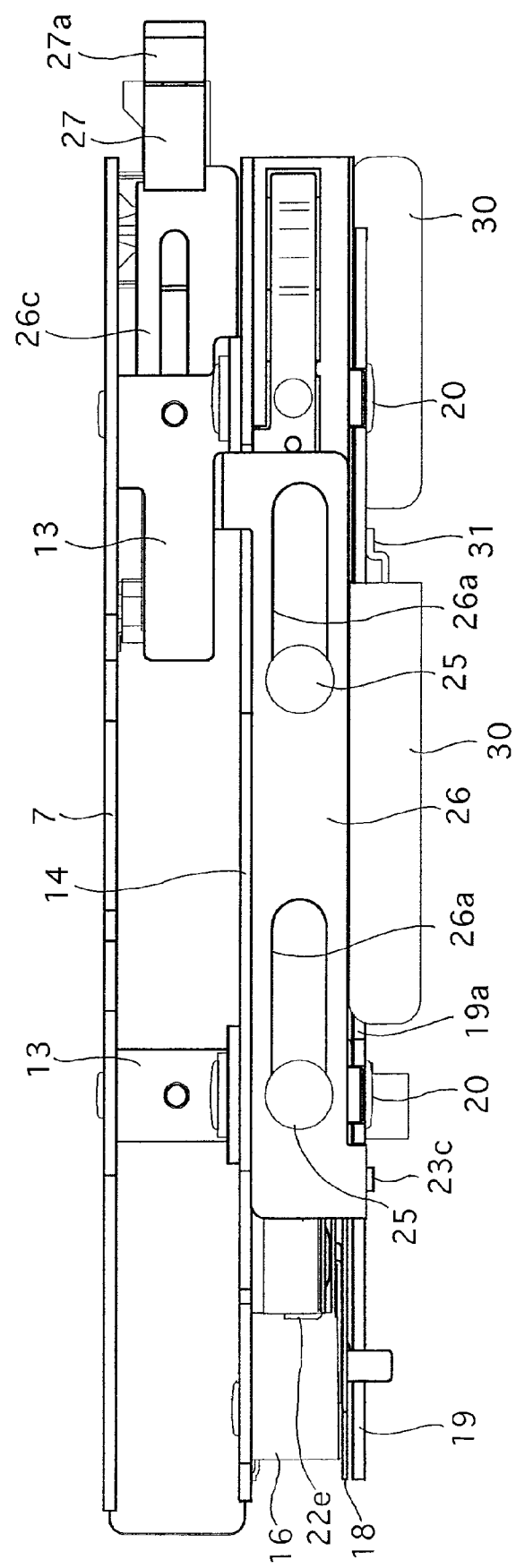
FIG. 3 is an enlarged front elevational view of a CF card receiving member, a PC card receiving member, and an ejection mechanism, etc., connected to each other through a plurality of substrates, according to the present invention.
Figure 4:
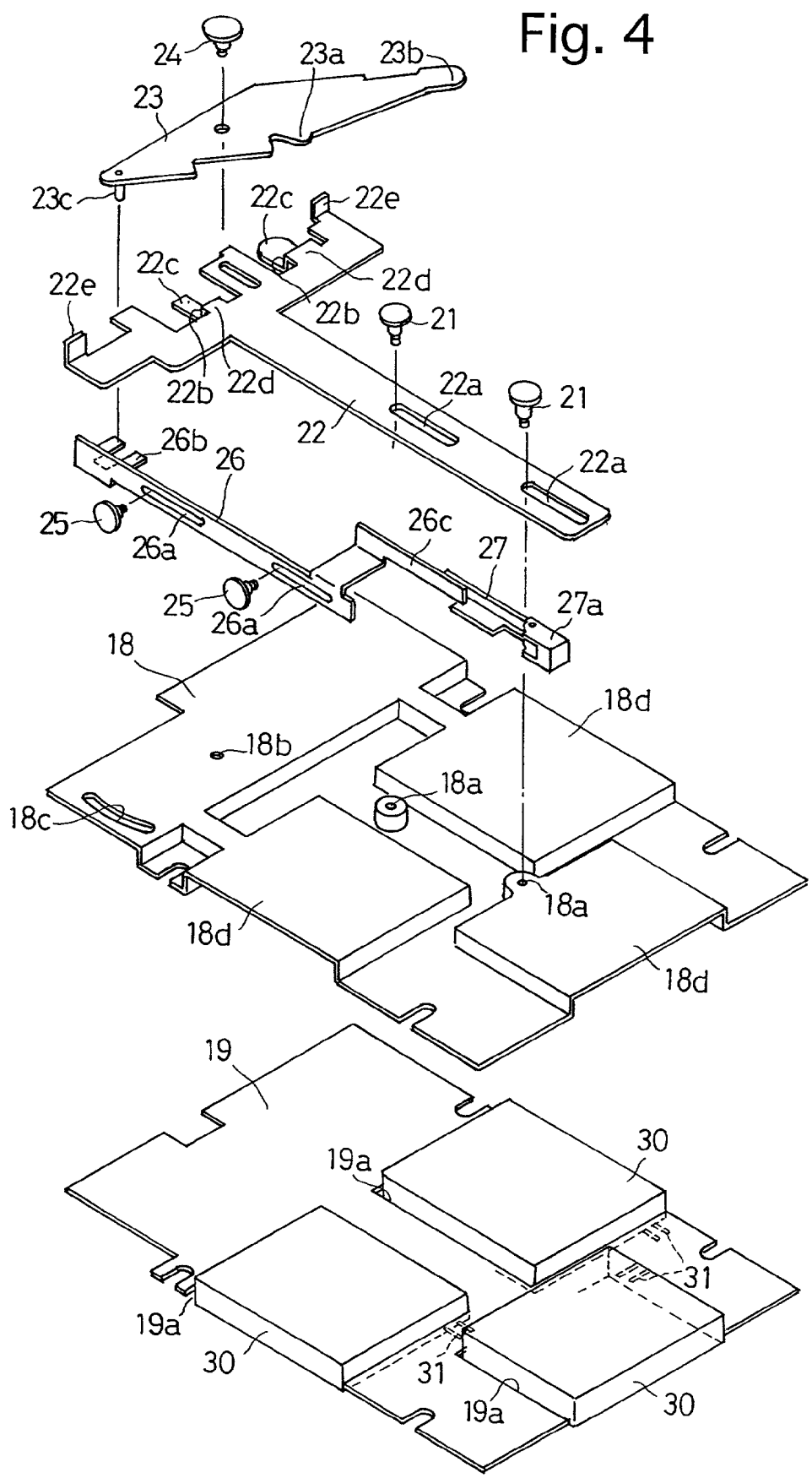
FIG. 4 is an exploded perspective view of an ejector, an ejector lever base-plate, and a second power supply circuit board, according to the present invention.
Figure 6:
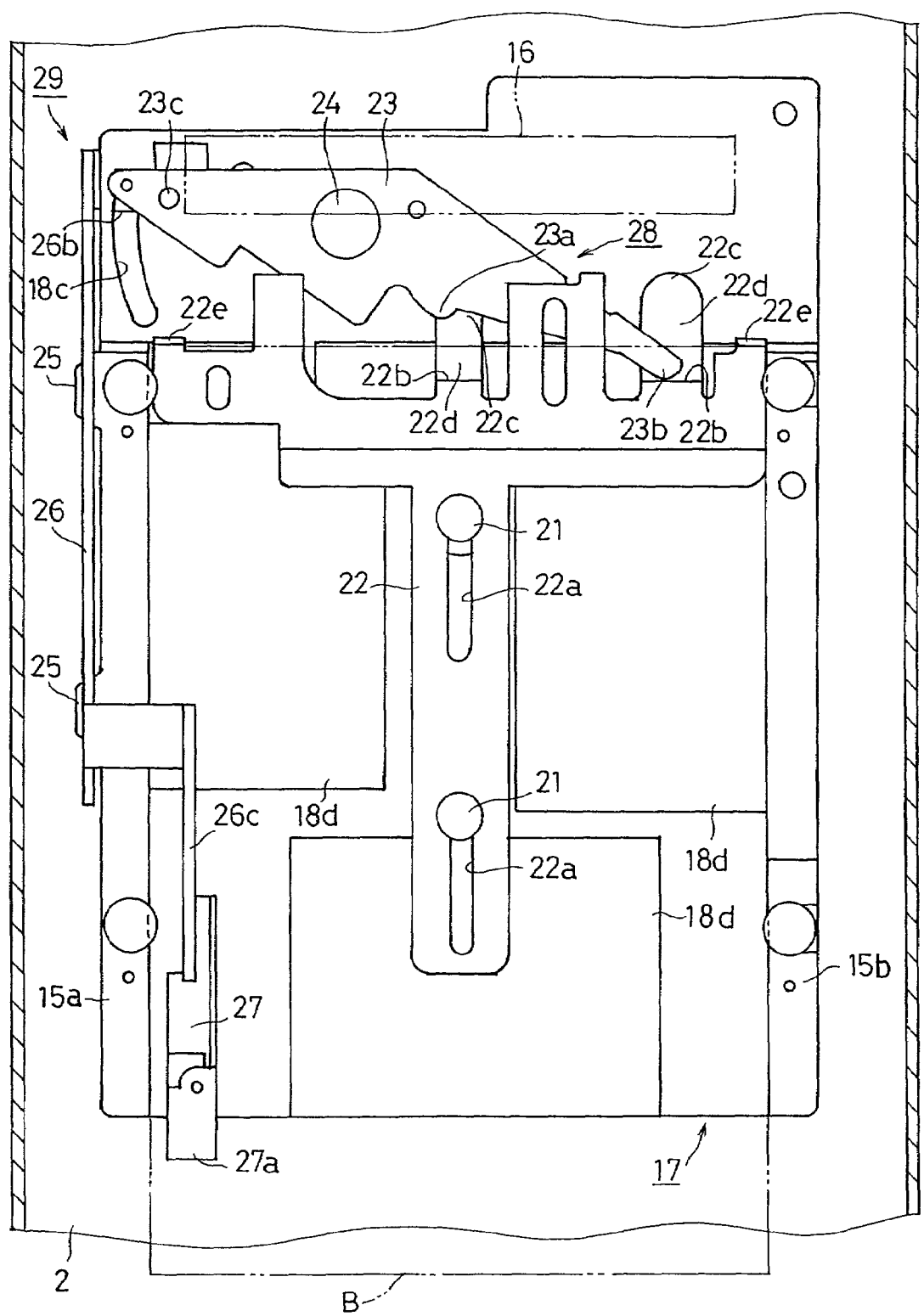
FIG. 6 is an enlarged cross sectional view similar to FIG. 5, showing a PC card disconnected from a PC card connector and ejected from a PC card receiving member, according to the present invention.
Figure 7:
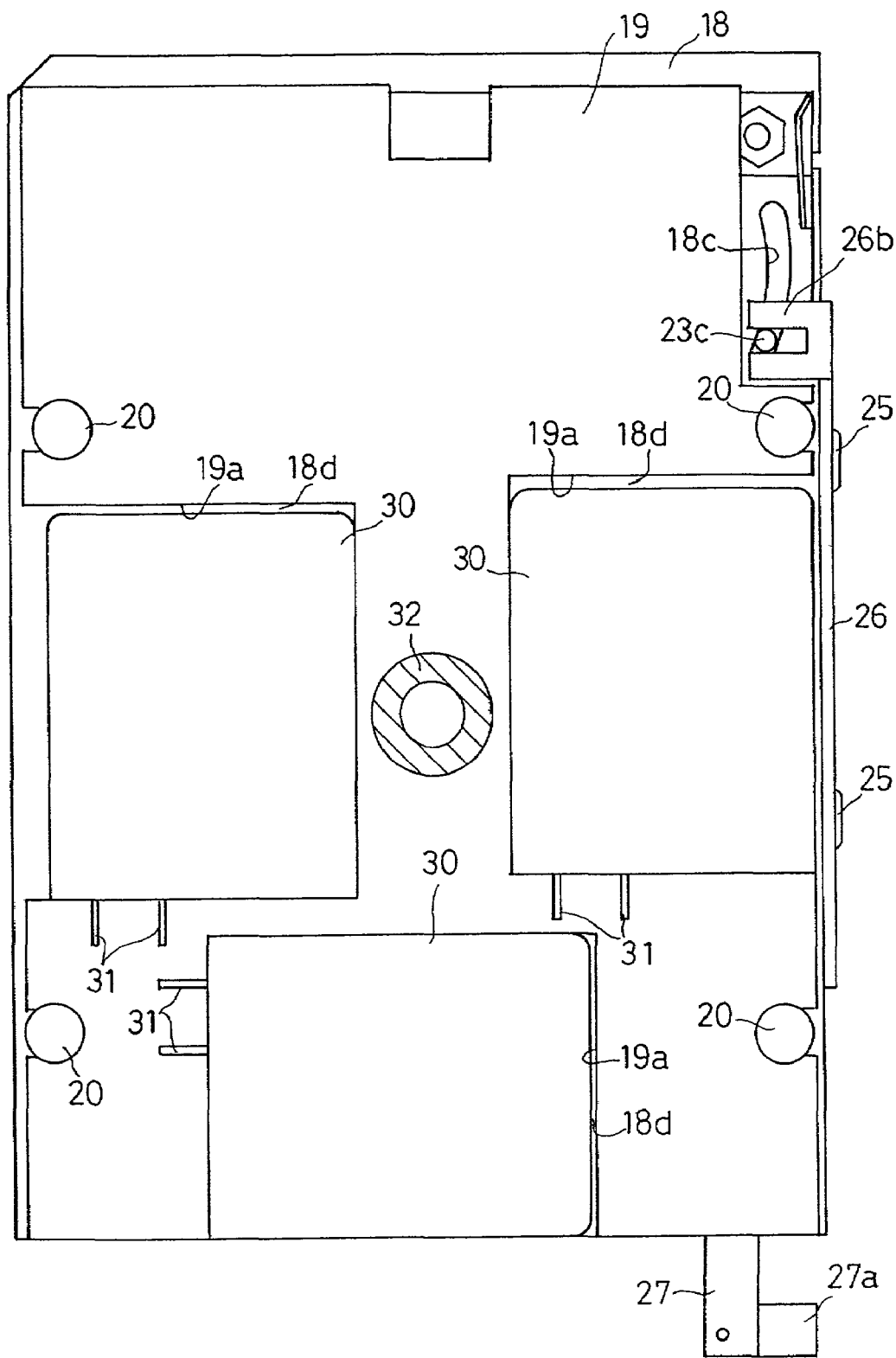
FIG. 7 is an enlarged bottom view taken along the line VII—VII in FIG. 2, with a camera body removed.

An ejector lever base-plate 18 is laid on top of a second power supply circuit board 19 having a coil (not shown) thereon and are secured to the lower surfaces of the front and rear PC card guides 15a and 15b with screws 20 (see FIGS. 3 and 7). As shown in FIG. 4, the ejector lever base-plate 18, which is magnetically shielded, is provided on its center portion with a pair of right and left mount holes 18a in which pins 21 are fitted. The pins 21 are fitted in elongated holes 22a formed in an ejector plate 22 which has a substantially T-shaped construction in a plan view. The ejector plate 22 is provided on its left end (with respect to FIG. 4) with a pair of front and rear receiving portions 22d having downwardly extending vertical portions 22b and leftwardly extending (with respect to FIG. 4) horizontal portions 22c, and a pair of front and rear projecting portions 22e. The ejector plate 22 is movable in the lateral directions between a retracted position shown in FIG. 5 and a protruded position shown in FIG. 6.

As shown in FIG. 4, the ejector lever base-plate 18 is provided on its left end (with respect to FIG. 4) with a supporting hole 18b and an arched guide hole 18c whose center is located on the axis of the supporting hole 18b. An ejector lever 23 is rotatably attached at its center portion to the supporting hole 18b through a pin 24 fitted therein. The ejector lever 23 is provided, on its rear portion (with respect to the forward/rearward direction of the digital camera 1), with a pair of pressing portions 23a and 23b, and on the front end portion thereof, with a downwardly extending engagement pin 23c that is inserted in the guide hole 18c.

The ejector lever 23 abuts at the front pressing portion 23a against the vertical portion 22b of the front receiving portion 22d and is rotatable between a non-biasing position (FIG. 5) in which the ejector plate 22 is not biased and a biasing position (FIG. 6) in which the rear pressing portion 23b abuts against the rear vertical portion 22b to bias the ejector plate 22 toward the biasing position.

The front PC card guide 15a is provided on its front surface with a pair of right and left threaded holes (not shown) in which screws 25 are screw-engaged. The screws 25 are fitted in elongated holes 26a of a push rod 26 extending in the lateral direction. The push rod 26 is provided on its left end (with respect to FIG. 4) with an engagement portion 26b which is engaged by the engagement pin 23c, as shown in FIG. 7. The push rod 26 is linearly movable in the lateral direction between an inoperative position (FIGS. 5 and 7), in which the ejector lever 23 is moved to the non-biasing position, and an operative position (FIG. 6), in which the ejector lever 23 is moved to the biasing position.

The push rod 26 is provided on its right end with an ejector-button protrusion 26c which is bent to extend above the first power supply circuit board 14. As shown in FIG. 2, the ejector-button protrusion 26c is located at the front of the CF card receiving member 11. The ejector-button protrusion 26c is provided on the right end thereof (with respect to FIG. 4) with an ejector-button attachment 27 secured thereto, which is provided with an ejector button (rotatable operation member) 27a which normally extends perpendicularly to the ejector-button protrusion 26c when the ejector button 27a is not in use, and extends in the same direction as the ejector-button protrusion 26c when the ejector button 27a is in use.

The ejector lever base-plate 18, the ejector plate 22, and the ejector lever 23 constitute an ejector 28, and the ejector 28 together with the push rod 26 and the ejector-button attachment 27 constitute an ejection mechanism 29 for the PC card "B".

The second power supply circuit board 19 is electrically connected to the first power supply circuit board 14, and is provided with three square cut-away portions (openings) 19a, in which electric double layer condensers 30 are fitted, as shown in FIGS. 4 and 7. Terminals 31 of the electric double layer condensers 30 are soldered to connector terminals (not shown) of the second power supply circuit board 19. The second power supply circuit board 19 is electrically connected to the substrates 5, 6 and 7, so that the electricity supplied to the electric double layer condensers 30 can be supplied thereto.

The electric double layer condensers 30 which project upward slightly from the second power supply circuit board 19 are fitted in three corresponding recesses 18d formed in the ejector lever base-plate 18 and are adhered to the lower surfaces of the recesses 18d by double-sided adhesive tape (not shown). The lower portions of the electric double layer condensers 30 project downwardly from the second power supply circuit board 19 (see FIGS. 2 and 3).

The camera body 2 is provided with a strong main base-plate 32a to which a tripod threaded-hole 32 is firmly connected. As shown in FIG. 7, the tripod threaded-hole 32 is located in a space defined between the lower portions of the electric double layer condensers 30.

Figure 2:
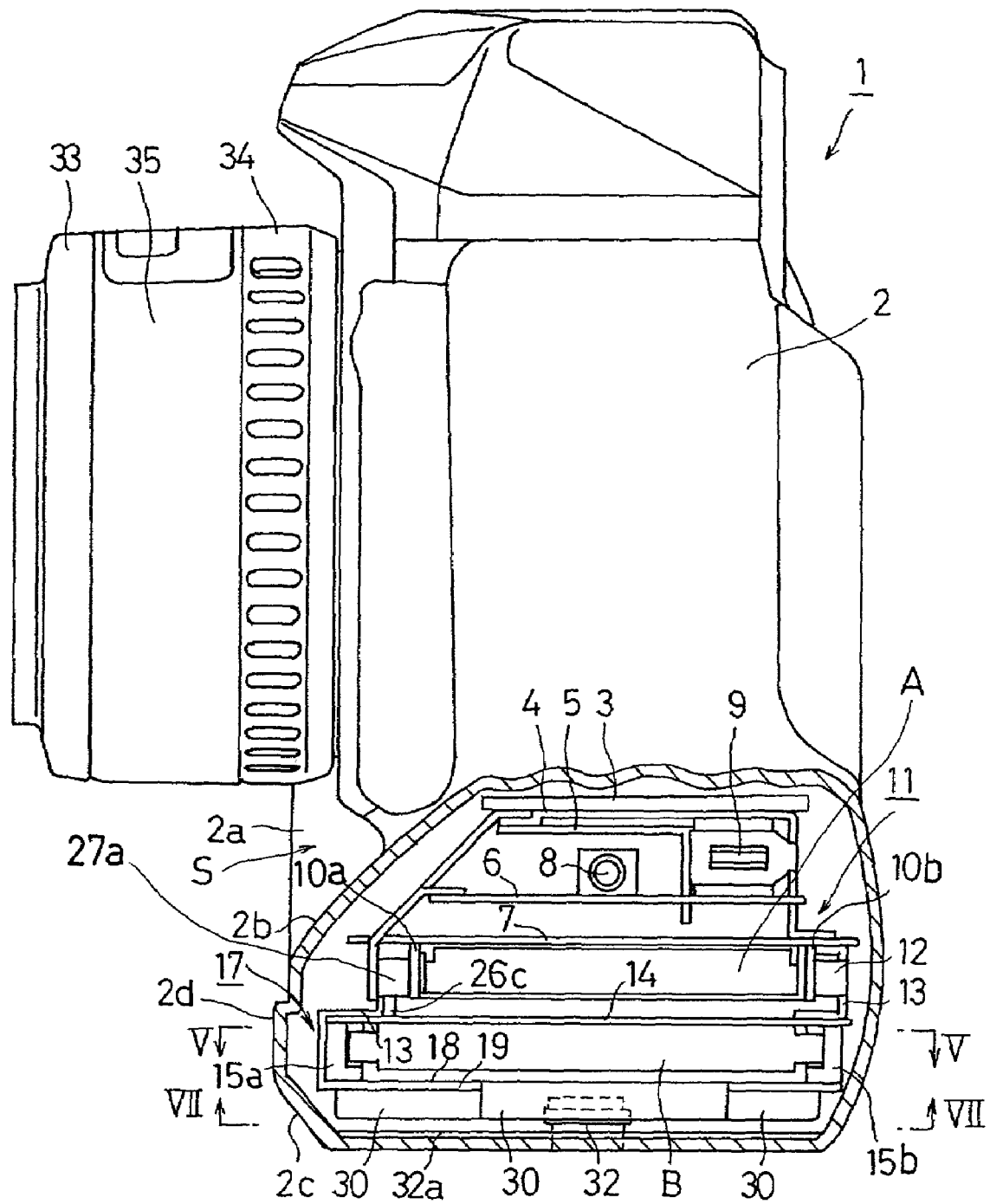
FIG. 2 is a partially broken side view of a digital camera shown in FIG. 1.

As can be seen in FIGS. 1 and 2, the camera body 2 is provided with a forwardly protruding grip portion 2a on the left side portion (with respect to FIG. 1) of the front surface of the camera body. The camera body 2 is also provided, on the lower portion of the front surface thereof, in addition to the grip portion 2a, with a inclined portion 2b which is inclined so that the amount of forward projection is gradually increased toward the bottom of the camera body. The bottom portion of the camera body forms a projecting portion 2c which is flush with the grip portion 2a. The inclined portion 2b and the projecting portion 2c constitute a forward projection 2d. As shown in FIG. 2, the CF card receiving member 11 is located in the inclined portion 2b and the PC card receiving member 17 is located in the projecting portion 2c.

A lens barrel 35 having a focusing ring 33 and a stop ring 34 is provided on the front surface of the camera body 2 and is located above the CF card receiving member 11.

The camera body 2 is provided, on the right and lower side portion thereof with respect to FIG. 1, with an opening 2e which is covered by a lid 36. The lid 36 can be closed to cover the opening 2e, and opened to expose the opening 2e.

When the lid 36 is open, not only can the PC card (large memory card) "B" and the CF card "A" be inserted therein and connected to the PC card connector 16 and the CF card connector, respectively, but also cables (not shown) can be connected to the video output terminal 8 and the external communication connector 9, as shown in FIG. 2.

When the ejector button 12 is depressed after the lid 36 is opened, the CF card connector is disconnected from the CF card "A", so that the CF card "A" can be removed from the CF card receiving member 11.

Figure 5:
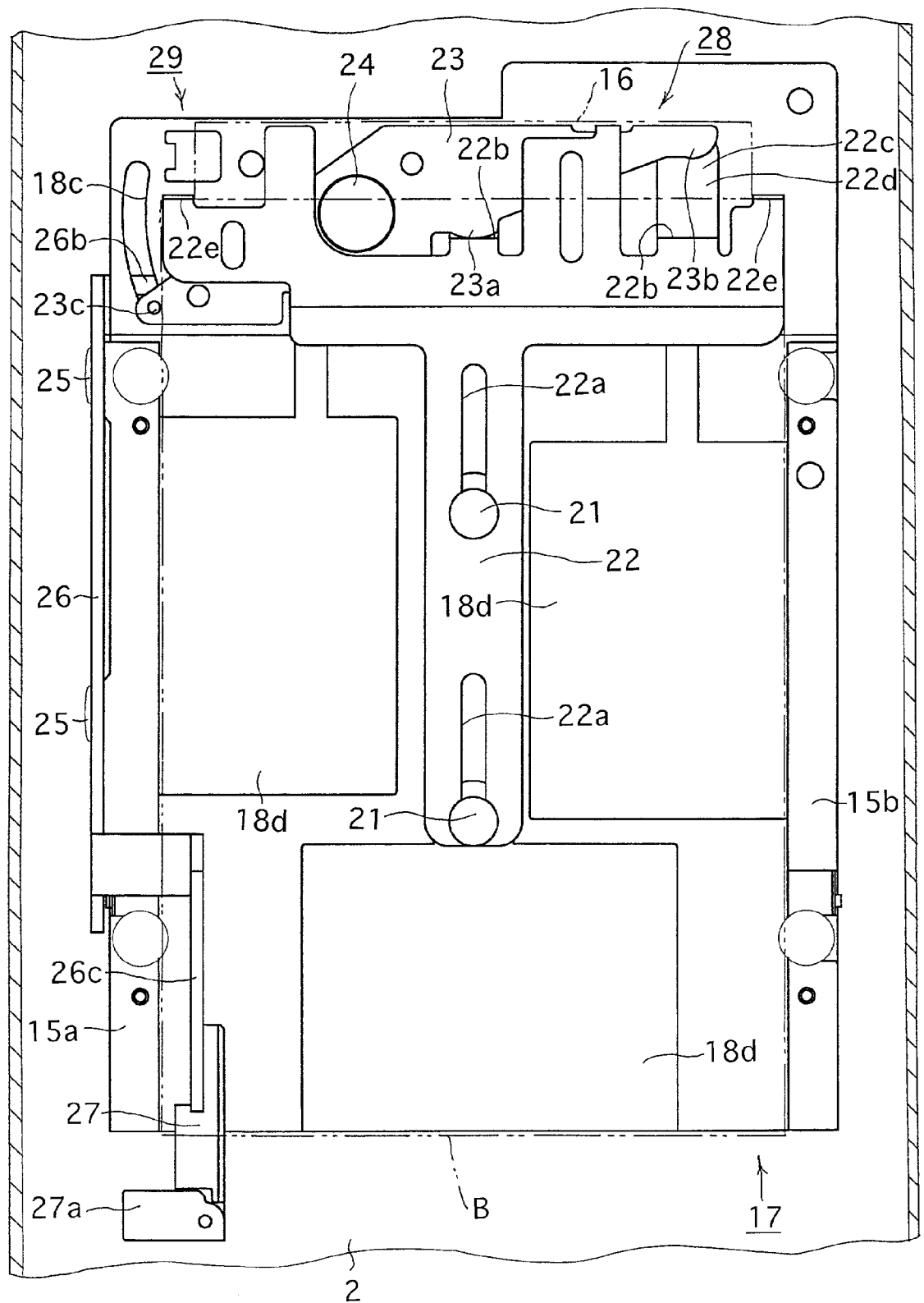
FIG. 5 is an enlarged cross sectional view taken along the line V—V in FIG. 2, showing a connection between a PC card and a PC card connector, according to the present invention.

If the lid 36 is opened when the PC card "B" is connected to the PC card connector 16, and if the operation member 27a is depressed in the lateral direction (in the left direction with respect to FIG. 1) upon the operation member 27a being moved so as to extend in the same direction as the ejector-button protrusion 26c, the ejector lever 23 is moved from the non-biasing position shown in FIG. 5, to the biasing position shown in FIG. 6. Consequently, the pressing portion 23b of the ejector lever 23 presses against the vertical portion 22b of the rear receiving portion 22d of the ejector plate 22 to thereby move the ejector plate 22 from the retracted position, shown in FIG. 5, to the protruded position shown in FIG. 6. Thus, the PC card "B" is disconnected from the PC card connector 16, so that the PC card "B" can be removed from the PC card receiving member 17.

In the digital camera 1 constructed as above, since the CF card "A" can be used together with the PC card "B" which has a large memory capacity, the storage capacity can be considerably increased, so that a large number of pictures can be taken without exchanging the PC card "B" or CF card "A".

Moreover, in the above-mentioned structure in which the projecting portion 2c and the inclined portion 2b are provided on the lower portion of the camera body 2, the PC card receiving member 17 is provided in the projecting portion 2c, and the CF card receiving member 11 is provided in the inclined portion 2b, so that the front end of the CF card receiving member 11 extends shorter than the front end of the PC card receiving member 17, a large space S in which an operator's hand is accessible is formed between the lens barrel 35 and the projecting portion 2c. Consequently, the focusing ring 33 or the stop ring 34 provided on the lens barrel 35 can be easily operated utilizing the space S.

Moreover, since the lengths of the CF card receiving member 11 in the forward/rearward direction and the lateral direction are smaller than the corresponding lengths of the PC card receiving member 17, the lower substrate 7, to which the CF card receiving member 11 and the CF card connector are mounted, can be made smaller than the first power supply circuit board 14 to which the PC card receiving member 17 is mounted, even if other electrical elements (not shown) are mounted to the lower substrate 7. Consequently, the camera body 2 can be made small.

Furthermore, since the three electric double layer condensers 30 are mounted to the second power supply circuit board 19, it is possible to accumulate a large quantity of electricity at one time. Consequently, a flash (not shown) can be repeatedly operated.

The electric double layer condensers 30 are thick in the upward/downward direction. However, since the electric double layer condensers 30 are fitted in the cut-away portions 19a formed in the second power supply circuit board 19, the thickness of the second power supply circuit board 19 has no influence on the size of the camera body 2 in the upward/downward direction. Consequently, the size of the camera body 2 in the upward/downward direction can be reduced.

Since the tripod threaded-hole 32 is provided in a space surrounded by the electric double layer condensers 30, the size of the camera body 2 in the upward/downward direction can be reduced in comparison with an arrangement in which the tripod threaded-hole is located below or above the electric double layer condensers 30.

Furthermore, since the electric double layer condensers 30 are located as close to each other as possible on the second power supply circuit board 19 while not interfering with the tripod threaded-hole 32, the second power supply circuit board 19 can be made small, and hence, the size of the bottom of the camera body 2 can be reduced in the horizontal direction.

Moreover, the second power supply circuit board 19, on which a coil which produces noise is provided, is provided in bottom portion of the camera body 2, and the upper surface of the second power supply circuit board 19 is covered by the magnetically shielded ejector lever base-plate 18. Therefore, electric devices mounted on the upper, intermediate and lower substrates 5, 6 and 7, and the first power supply circuit board 14 are free from the noise produced by the coil.

Note that instead of a PC card, a PCT smart medium or the like can be used as a large memory card, a memory stick can be used as a small memory card, instead of a CF card.

Since the ejector-button protrusion 26c, and hence the ejector button 27a, of the push rod 26 to eject the PC card "B" from the PC card receiving member 17, having a large width in the forward/rearward direction, is provided in front of the CF card receiving member 11, and the ejector button 12 for the CF card "A" is provided behind the CF card receiving member 11, having a small width in the forward/rearward direction, the width of the camera body in the same direction can be reduced.

Moreover, the ejection mechanism 29 for the PC card is simply constructed from ejector lever base-plate 18, the ejector plate 22, the ejector lever 23, the push rod 26, and the ejector-button attachment 27, the ejection mechanism 29 can be manufactured less expensively.

As can be understood from the above discussion, according to the present invention, not only can the memory capacity for the digital camera 1 be increased but also the operability of the lens barrel 35 can be enhanced by forming a large space S between the lens barrel 35 and the projecting portion 2c of the camera body 2. In addition, since the size of the CF card receiving member 11 is smaller than the size of the PC card receiving member 17, the camera body can be made small.

Moreover according to the present invention, in an mobile instrument in which a small memory card receiving member having a small width lies above a large memory card receiving member having a large width, on a plane parallel thereto, the ejector button to eject the memory card inserted in at least one memory card receiving member is provided on at least one side of the memory card receiving member having a small width. Consequently, the width of mobile instrument can be made small.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A digital camera comprising:
   a small memory card receiving member configured to receive a small memory card;
   a large memory card receiving member configured to receive a large memory card wherein a size of said large memory card in a forward/rearward direction of the digital camera body is larger than a size of said small memory card in the forward/rearward direction; and
   a projecting portion having an inclined portion which protrudes in a forward direction toward a bottom portion of the digital camera body, said projecting portion being located below a lens barrel of said digital camera and protruding more in a forward direction than in a rearward direction;
   wherein said small memory card receiving member and said large memory card receiving member are provided within said projecting portion in the digital camera body, said small memory card receiving member being located above the large memory card receiving member and located within the inclined portion in the digital camera body; and
   wherein a front end of said small memory card receiving member is located at a position more rearward than a front end of said large memory card receiving member.

2. The digital camera according to claim 1, wherein said large memory card receiving member comprises a PC card receiving member, and said small memory card receiving member comprises a CF card receiving member.

3. The digital camera according to claim 1, wherein a side surface of the digital camera body is provided with an opening providing access to said small and large memory card receiving members.

4. A digital camera according to claim 1, wherein said small memory card receiving member and said large memory card receiving member are provided in a housing which is a part of the camera body, wherein a front portion of the housing extends beneath the camera lens and a rear portion of the housing is substantially flush with the rear portion of the camera body.

5. An ejection mechanism for a memory card in a mobile instrument, comprising:
   a small memory card receiving member which is configured to removably receive a small memory card;
   a large memory card receiving member which is configured to removably receive a large memory card, wherein a size of said large memory card receiving member in a direction perpendicular to a memory card insertion direction thereof is larger than a size of the small memory card receiving member in the direction perpendicular to the insertion direction;
   an ejector button for ejecting the large memory card that is received by the large memory card receiving member; wherein
   said small memory card receiving member extends in a plane parallel to a major plane of said large memory card receiving member; and
   said ejector button is provided in a space on at least one side of said small memory card receiving member and disposed entirely within a major plane of the small memory card receiving member, said ejector button remaining within the major plane upon actuation of said ejector button.

6. The ejection mechanism for a memory card in a mobile instrument according to claim 5, wherein said small memory card receiving member is located above said large memory card receiving member.

7. The ejection mechanism for a memory card in a mobile instrument according to claim 5, wherein said large memory card receiving member comprises a PC card receiving member, and the small memory card receiving member comprises a CF card receiving member.

8. The ejection mechanism for a memory card in a mobile instrument according to claim 5, wherein a side surface of a mobile instrument is provided with an opening providing access to said small and large memory card receiving members.

9. The ejection mechanism for a memory card in a mobile instrument according to claim 5, wherein the mobile instrument comprises a digital camera.

10. The ejector mechanism for a memory card in a mobile instrument according to claim 5, further comprising:

a further ejector button for ejecting the small memory card that is received by said small memory card receiving member;

wherein said ejector button is positioned on substantially a same horizontally extending plane as said further ejector button.

11. The ejector mechanism for a memory card in a mobile instrument according to claim 5, further comprising:

a further ejector button for ejecting the small memory card that is received by said small memory card receiving member.

12. The ejector mechanism for a memory card in a mobile instrument according to claim 5, further comprising:

a further ejector button for ejecting the small memory card that is received by said small memory card receiving member;

wherein said ejector button and said further ejector button are positioned at opposite ends of the small memory card receiving member.

* * * * *